US010336292B2

United States Patent
Dehnert et al.

(10) Patent No.: US 10,336,292 B2
(45) Date of Patent: Jul. 2, 2019

(54) SEAT BELT

(71) Applicant: Clark Equipment Company, West Fargo, ND (US)

(72) Inventors: Brian P. Dehnert, Mandan, ND (US); Jonathan J. Roehrl, Bismarck, ND (US)

(73) Assignee: Clark Equipment Company, West Fargo, ND (US)

( * ) Notice: Subject to any disclaimer, the term of this patent is extended or adjusted under 35 U.S.C. 154(b) by 0 days.

(21) Appl. No.: 15/689,527

(22) Filed: Aug. 29, 2017

(65) Prior Publication Data

US 2018/0056929 A1 Mar. 1, 2018

Related U.S. Application Data

(60) Provisional application No. 62/444,546, filed on Jan. 10, 2017, provisional application No. 62/381,245, filed on Aug. 30, 2016.

(51) Int. Cl.
*B60R 22/02* (2006.01)
*B60R 22/26* (2006.01)
(Continued)

(52) U.S. Cl.
CPC .............. *B60R 22/02* (2013.01); *B60R 22/12* (2013.01); *B60R 22/26* (2013.01);
(Continued)

(58) Field of Classification Search
CPC . B60R 22/02; B60R 22/26; B60R 2021/0081; B60R 2022/006; B60R 2022/021
See application file for complete search history.

(56) References Cited

U.S. PATENT DOCUMENTS 3,340,523 A 9/1967 Whitman
3,449,714 A 6/1969 Farley, Jr.
(Continued)

FOREIGN PATENT DOCUMENTS

DE 19717622 A1 10/1998
EP 1132292 A2 9/2001
(Continued)

OTHER PUBLICATIONS

Invitation to Pay Additional Fees with Provisional Opinion dated Oct. 19, 2017 for International Application No. PCT/US2017/049081 filed Aug. 29, 2017, 10 pages.
(Continued)

*Primary Examiner* — James A English
(74) *Attorney, Agent, or Firm* — John D. Veldhuis-Kroeze; Westman, Champlin & Koehler, P.A.

(57) ABSTRACT

Disclosed seat belt assemblies or mechanisms include a seat belt guide which positions the seat belt for convenient ingress and egress by an operator, but in a position which reminds the operator to fasten the seat belt. The seat belt guide is configured to be stiffer in one direction of movement to maintain the metal tab of the seat belt at a raised position to one side of the operator seat, for example at a position adjacent to an operator joystick or control, but to allow the guide and the seat belt to be moved across the operator seat (and operator) for buckling.

17 Claims, 6 Drawing Sheets

(51) Int. Cl.
    *B60R 22/12*    (2006.01)
    *B60R 21/00*    (2006.01)
    *B60R 22/00*    (2006.01)
(52) U.S. Cl.
    CPC . *B60R 2021/0081* (2013.01); *B60R 2022/006* (2013.01); *B60R 2022/021* (2013.01)

(56) References Cited

U.S. PATENT DOCUMENTS

| | | | | |
|---|---|---|---|---|
| 3,550,955 | A | * | 12/1970 | Chamberlain ........... B60R 22/22 297/482 |
| 3,665,385 | A | | 5/1972 | Booth |
| 3,823,978 | A | | 7/1974 | Dove |
| 3,863,209 | A | | 1/1975 | Hollins |
| 4,480,713 | A | * | 11/1984 | Macht ..................... B60N 2/38 180/268 |
| 4,844,196 | A | * | 7/1989 | Clevenger, Jr. ......... B60R 22/48 180/273 |
| 4,856,612 | A | | 8/1989 | Clevenger, Jr. et al. |
| 4,871,044 | A | | 10/1989 | Strosser et al. |
| 5,425,431 | A | | 6/1995 | Brandt et al. |
| 5,547,039 | A | | 8/1996 | Berger et al. |
| 5,711,391 | A | | 1/1998 | Brandt et al. |
| 5,883,441 | A | | 3/1999 | Shoemaker |
| 5,924,516 | A | | 7/1999 | Sagaser et al. |
| 5,960,903 | A | * | 10/1999 | Abels ..................... B60R 22/26 180/315 |
| 6,126,241 | A | * | 10/2000 | Wier ................... B60R 22/1951 280/806 |
| 6,135,230 | A | | 10/2000 | Schenck et al. |
| 6,186,260 | B1 | | 2/2001 | Schenck et al. |
| 6,189,646 | B1 | | 2/2001 | Brandt et al. |
| 7,111,872 | B2 | | 9/2006 | Arand |
| 7,140,830 | B2 | | 11/2006 | Berger et al. |
| 7,383,620 | B2 | * | 6/2008 | Smith ................. A44B 11/2553 24/265 EC |
| 7,648,171 | B2 | * | 1/2010 | Marriott ............. A44B 11/2576 280/801.1 |
| 2001/0025400 | A1 | * | 10/2001 | Romca ................... B60N 2/688 24/31 R |
| 2004/0026149 | A1 | * | 2/2004 | Wilkinson .............. B60R 22/02 180/272 |
| 2008/0088170 | A1 | * | 4/2008 | Kim ....................... B60R 22/00 297/468 |

FOREIGN PATENT DOCUMENTS

| | | |
|---|---|---|
| EP | 1914127 A1 | 4/2008 |
| FR | 2536024 A1 | 5/1984 |
| WO | 0224494 A1 | 3/2002 |
| WO | 2012173501 A2 | 12/2012 |

OTHER PUBLICATIONS

International Search Report and Written Opinion dated Nov. 20, 2017 for International Application No. PCT/US2017/049081 filed Aug. 29, 2017, 15 pages.

* cited by examiner

SEAT BELT

CROSS-REFERENCE TO RELATED APPLICATIONS

This application claims the benefit of U.S. Provisional Application No. 62/381,245, which was filed on Aug. 30, 2016 and U.S. Provisional Application No. 62/444,546, which was filed on Jan. 10, 2017.

BACKGROUND

The present disclosure is directed toward power machines. More particularly, the present disclosure is related to seat belts in power machines such as loaders. Power machines, for the purposes of this disclosure, include any type of machine that generates power for the purpose of accomplishing a particular task or a variety of tasks. One type of power machine is a work vehicle. Work vehicles, such as loaders, are generally self-propelled vehicles that have a work device, such as a lift arm (although some work vehicles can have other work devices) that can be manipulated to perform a work function. Work vehicles include loaders, excavators, utility vehicles, tractors, and trenchers, to name a few examples.

In some power machines, such as skid steer or other loaders, an operator compartment includes an operator seat equipped with a seat belt. The seat belt is provided so that operator can secure oneself within an operator compartment by fastening the seat belt. It is beneficial for the seat belt to be easily accessible so that an operator can sit down and easily fasten the seat belt.

The discussion above is merely provided for general background information and is not intended to be used as an aid in determining the scope of the claimed subject matter.

SUMMARY

This Summary and the Abstract are provided to introduce a selection of concepts in a simplified form that are further described below in the Detailed Description. The summary and the abstract are not intended to identify key features or essential features of the claimed subject matter, nor are they intended to be used as an aid in determining the scope of the claimed subject matter.

Typical seat belt assemblies have a tongue on a first portion of the seat belt that is insertable into a buckle on a second portion of the seat belt to fasten the seat belt. Disclosed seat belt assemblies or mechanisms include a seat belt guide which positions one portion of the seat belt out of the way of an operator for convenient ingress into and egress out of an operator seat, but in a position which reminds the operator to fasten the seat belt. The seat belt guide is configured to be stiffer in one direction of movement to maintain an end of one portion of the seat belt at a raised position on one side of the operator seat, for example at a position adjacent to an operator joystick or control lever, and flexible in another direction to allow the one portion of the seat belt to be moved easily across the operator seat (and operator) for fastening to another portion of the seat belt assembly.

In some exemplary embodiments, a seat belt guide for a power machine is provided. The seat belt guide includes a stiffener, an attachment portion connected to a first end of the stiffener and configured to be attached to an operator seat of the power machine or to the power machine adjacent the operator seat, and a tongue engagement member connected to a second end of the stiffener and configured to support a tongue of a seat belt. The stiffener and tongue engagement member are configured and arranged to hold the tongue in a generally inline position with respect to a longitudinal direction of the stiffener.

In some exemplary embodiments, the stiffener includes a stiffening element configured to maintain the tongue of the seat belt at a raised position relative to the operator seat when the tongue is not engaged with a corresponding seat belt buckle. The stiffening element is configured to allow bending in the longitudinal direction, but resist bending in directions orthogonal to the longitudinal direction. In some exemplary embodiments, the stiffening element includes plastic or metal, for example spring steel.

In some exemplary embodiments, the tongue engagement member includes a tab configured to support the tongue in the generally inline position with respect to a longitudinal direction of the stiffener. The tab of the tongue engagement member can extend in the longitudinal direction from an end surface of the tongue engagement member.

In some exemplary embodiments, the tongue engagement member and the attachment portion each include apertures. The seat belt guide can further include a material on each of two sides of the stiffening element, with the material extending through the apertures of the tongue engagement member and the attachment portion.

In some exemplary embodiments, an operator compartment of a power machine includes an operator seat, a seat belt including a first portion having a tongue and a second portion having a buckle configured to engage with the tongue, and a seat belt guide configured to position the seat belt tongue at a position raised from the operator seat. The raised position provided by the seat belt guide allows ingress into the operator compartment to access the operator seat without interference from the first portion of the seat belt when the tongue is not engaged with the buckle.

In some embodiments, the operator compartment further comprises an operator input device, such as a joystick controller, positioned in front of the operator seat. The seat belt guide can be configured to position the seat belt tongue at the position raised from the operator seat when the tongue is not engaged with the buckle such that the seat belt tongue is positioned adjacent to the operator input device. Such positioning can interfere with the operator's use of the input device until the seat belt is buckled, and thus provide a reminder to the operator to do so.

In some exemplary embodiments of the operator compartment, the seat belt guide further comprises a stiffener configured to allow bending in a longitudinal direction of the seat belt guide, but resist bending in directions orthogonal to the longitudinal direction. The stiffener can include a stiffening element configured to allow bending in the longitudinal direction, but resist bending in directions orthogonal to the longitudinal direction. In some embodiments, the stiffening element is formed of at least one of spring steel, other metal, and plastic.

In some exemplary embodiments of the operator compartment, the seat belt guide further includes a tongue engagement member connected to the stiffener and configured to support the tongue at the position raised from the operator seat. The tongue engagement member can include a tab configured to support the tongue in a generally inline position with respect to the longitudinal direction of the seat belt guide. The tab can extend in the longitudinal direction from an end surface of the tongue engagement member.

In some exemplary embodiments of the operator compartment, the seat belt guide further includes an attachment portion connected the stiffener and attached to a portion of the operator compartment. The tongue engagement member and the attachment portion can each include apertures through which a material, positioned on each of the two sides of the stiffening element, of the seat belt guide can extend.

DRAWINGS

DETAILED DESCRIPTION

The concepts disclosed in this discussion are described and illustrated with reference to exemplary embodiments. These concepts, however, are not limited in their application to the details of construction and the arrangement of components in the illustrative embodiments and are capable of being practiced or being carried out in various other ways. The terminology in this document is used for the purpose of description and should not be regarded as limiting. Words such as "including," "comprising," and "having" and variations thereof as used herein are meant to encompass the items listed thereafter, equivalents thereof, as well as additional items.

Disclosed embodiments are directed to seat belt assemblies or mechanisms that have first and second portions that are coupled to a seat or other parts of a frame of the vehicle and are connectable to secure an operator to the seat. Seat belt assemblies disclosed herein that allow for positioning of at least one portion of the seat belt for convenient access by an operator such that the operator is reminded to fasten the seat belt after sitting in the seat, but such that the seat belt is not in the way of the operator when entering or exiting an operator seat. Disclosed embodiments allow for retraction of one portion the seat belt assembly, not unlike many seat belts that are known in the art, but also advantageously maintain an unretracted length of one portion of the seat belt in an easily accessible position so that an operator can sit down and quickly fasten the seat belt using an operation that can be accomplished with only one hand. A seat belt guide is mounted to the seat, or in some cases, to a portion of a frame of the machine, to position an end of one portion of the seat belt, in some embodiments, the portion of the seat belt to which the tongue is attached. The guide is semi-rigid in one direction, but moves most easily in a direction to allow the portion of the seat belt to which it is attached to move across an operator's lap so that it can be fastened to the other portion of the seat belt. The guide is stiffer in another direction to maintain a length of the seat belt that is not retracted when the seat belt is not fasted in a raised position. In exemplary embodiments described below, the portion of the seat belt that is engaged by the guide is able to extend and retract within or relative to the guide. Disclosed embodiments can be used in a variety of applications, but are especially advantageous for use in loader type power machines wherein an operator enters an operator compartment from a front of the machine.

Figure 2:
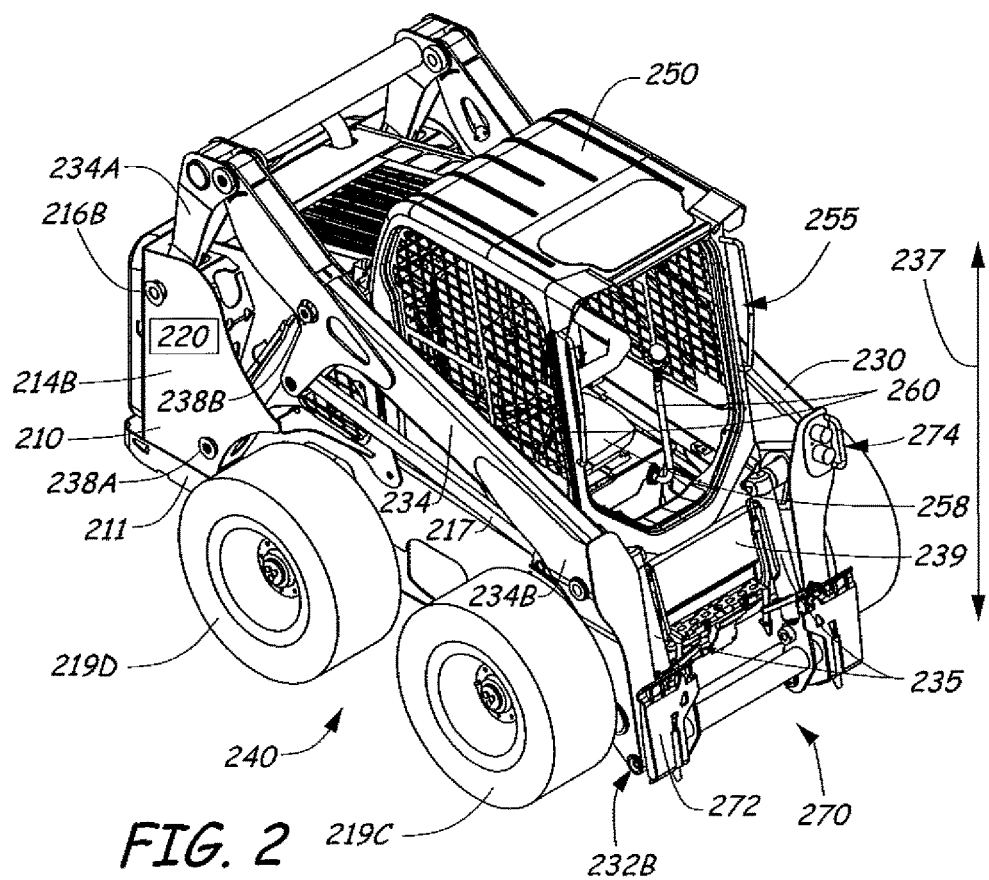
FIGS. 2-3 illustrate perspective views of a representative power machine in the form of a skid-steer loader of the type on which the disclosed embodiments can be practiced.
Figure 3:
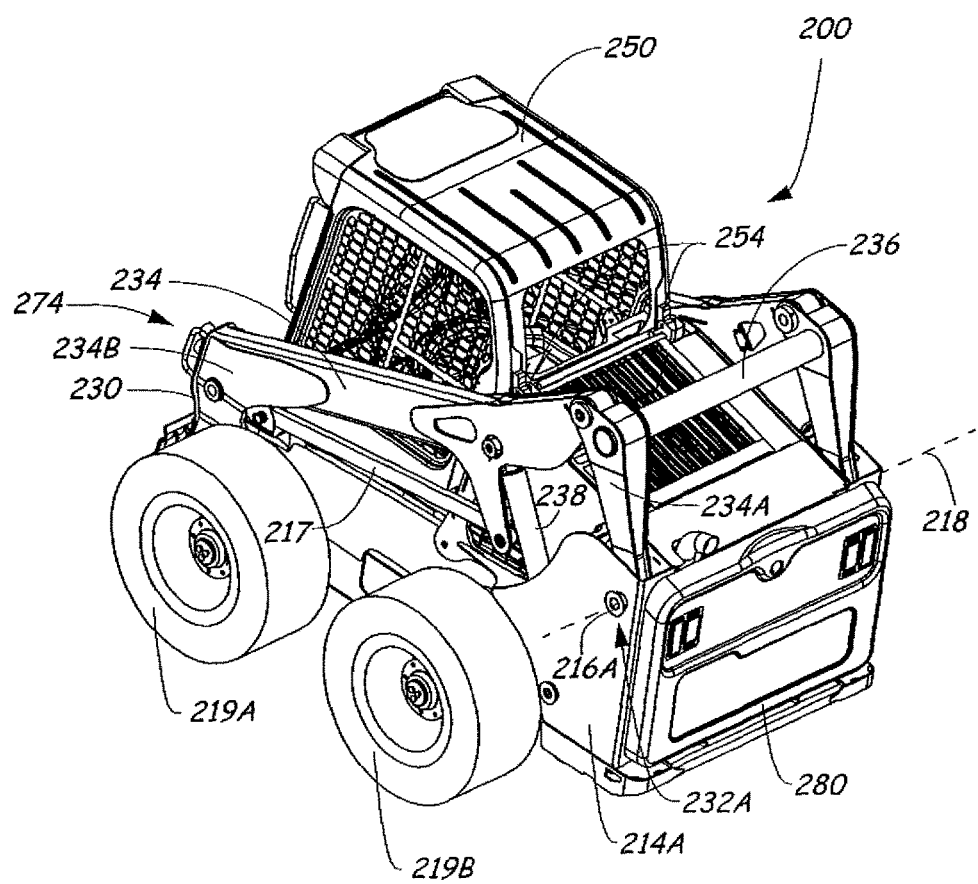

These concepts can be practiced on various power machines, as will be described below. A representative power machine on which the embodiments can be practiced is illustrated in diagram form in FIG. 1 and one example of such a power machine is illustrated in FIGS. 2-3 and described below before any embodiments are disclosed. For the sake of brevity, only one power machine is illustrated and discussed as being a representative power machine. However, as mentioned above, the embodiments below can be practiced on any of a number of power machines, including power machines of different types from the representative power machine shown in FIGS. 2-3. Power machines, for the purposes of this discussion, include a frame, at least one work element, and a power source that can provide power to the work element to accomplish a work task. One type of power machine is a self-propelled work vehicle. Self-propelled work vehicles are a class of power machines that include a frame, work element, and a power source that can provide power to the work element. At least one of the work elements is a motive system for moving the power machine under power.

Figure 1:
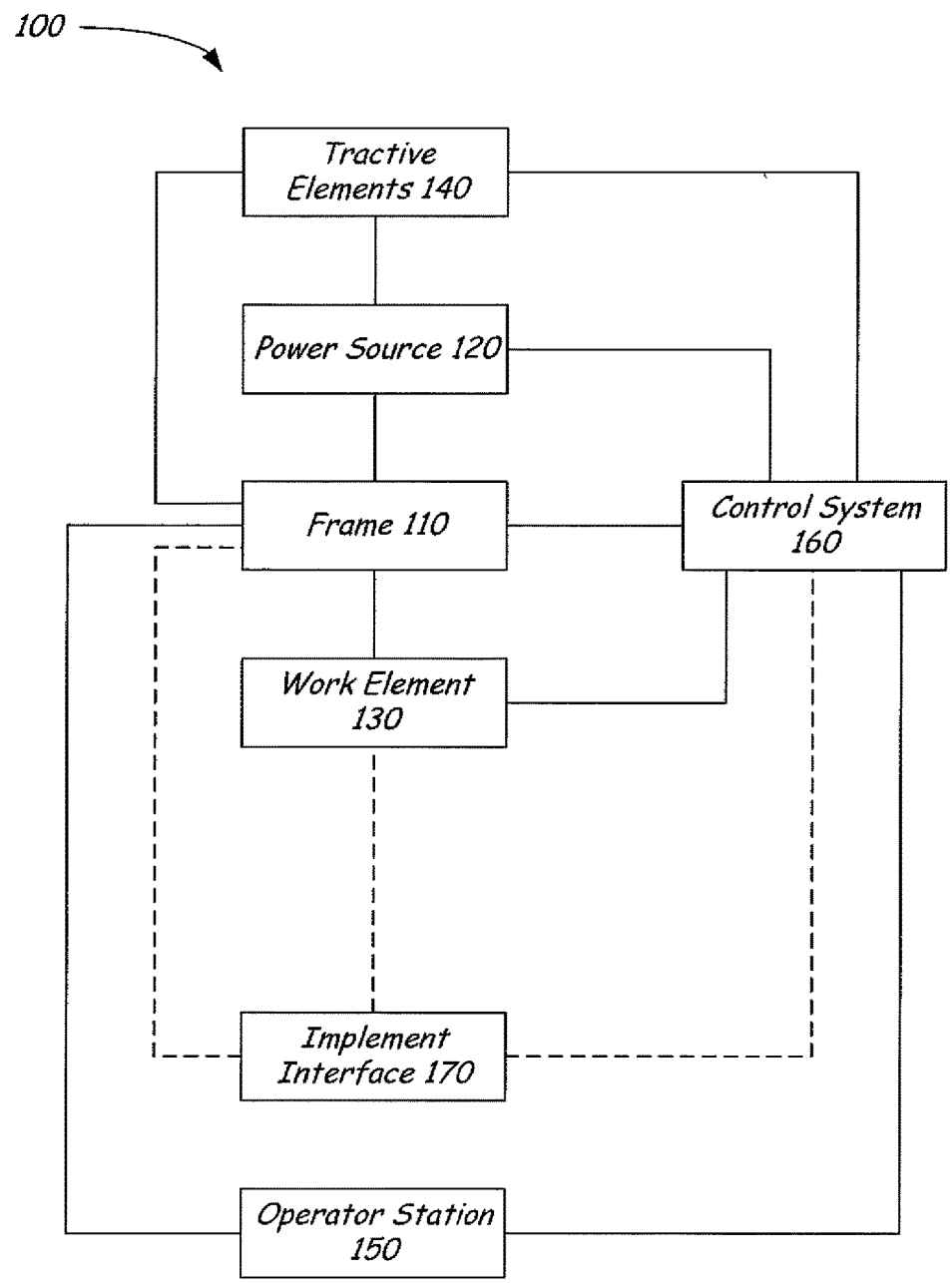
FIG. 1 is a block diagram illustrating functional systems of a representative power machine on which embodiments of the present disclosure can be advantageously practiced.

FIG. 1 is a block diagram that illustrates the basic systems of a power machine 100, which can be any of a number of different types of power machines, upon which the embodiments discussed below can be advantageously incorporated. The block diagram of FIG. 1 identifies various systems on power machine 100 and the relationship between various components and systems. As mentioned above, at the most basic level, power machines for the purposes of this discussion include a frame, a power source, and a work element. The power machine 100 has a frame 110, a power source 120, and a work element 130. Because power machine 100 shown in FIG. 1 is a self-propelled work vehicle, it also has tractive elements 140, which are themselves work elements provided to move the power machine over a support surface and an operator station 150 that provides an operating position for controlling the work elements of the power machine. A control system 160 is provided to interact with the other systems to perform various work tasks at least in part in response to control signals provided by an operator.

Certain work vehicles have work elements that can perform a dedicated task. For example, some work vehicles have a lift arm to which an implement such as a bucket is attached such as by a pinning arrangement. The work element, i.e., the lift arm can be manipulated to position the implement to perform the task. The implement, in some instances can be positioned relative to the work element, such as by rotating a bucket relative to a lift arm, to further position the implement. Under normal operation of such a work vehicle, the bucket is intended to be attached and under use. Such work vehicles may be able to accept other implements by disassembling the implement/work element combination and reassembling another implement in place of the original bucket. Other work vehicles, however, are intended to be used with a wide variety of implements and have an implement interface such as implement interface 170 shown in FIG. 1. At its most basic, implement interface 170 is a connection mechanism between the frame 110 or a work element 130 and an implement, which can be as simple as a connection point for attaching an implement directly to the frame 110 or a work element 130 or more complex, as discussed below.

On some power machines, implement interface 170 can include an implement carrier, which is a physical structure movably attached to a work element. The implement carrier has engagement features and locking features to accept and secure any of a number of implements to the work element. One characteristic of such an implement carrier is that once an implement is attached to it, it is fixed to the implement (i.e. not movable with respect to the implement) and when the implement carrier is moved with respect to the work element, the implement moves with the implement carrier. The term implement carrier as used herein is not merely a pivotal connection point, but rather a dedicated device specifically intended to accept and be secured to various different implements. The implement carrier itself is mountable to a work element 130 such as a lift arm or the frame 110. Implement interface 170 can also include one or more power sources for providing power to one or more work elements on an implement. Some power machines can have a plurality of work element with implement interfaces, each of which may, but need not, have an implement carrier for receiving implements. Some other power machines can have a work element with a plurality of implement interfaces so that a single work element can accept a plurality of implements simultaneously. Each of these implement interfaces can, but need not, have an implement carrier.

Frame 110 includes a physical structure that can support various other components that are attached thereto or positioned thereon. The frame 110 can include any number of individual components. Some power machines have frames that are rigid. That is, no part of the frame is movable with respect to another part of the frame. Other power machines have at least one portion that can move with respect to another portion of the frame. For example, excavators can have an upper frame portion that rotates with respect to a lower frame portion. Other work vehicles have articulated frames such that one portion of the frame pivots with respect to another portion for accomplishing steering functions.

Frame 110 supports the power source 120, which is configured to provide power to one or more work elements 130 including the one or more tractive elements 140, as well as, in some instances, providing power for use by an attached implement via implement interface 170. Power from the power source 120 can be provided directly to any of the work elements 130, tractive elements 140, and implement interfaces 170. Alternatively, power from the power source 120 can be provided to a control system 160, which in turn selectively provides power to the elements that capable of using it to perform a work function. Power sources for power machines typically include an engine such as an internal combustion engine and a power conversion system such as a mechanical transmission or a hydraulic system that is configured to convert the output from an engine into a form of power that is usable by a work element. Other types of power sources can be incorporated into power machines, including electrical sources or a combination of power sources, known generally as hybrid power sources.

FIG. 1 shows a single work element designated as work element 130, but various power machines can have any number of work elements. Work elements are typically attached to the frame of the power machine and movable with respect to the frame when performing a work task. In addition, tractive elements 140 are a special case of work element in that their work function is generally to move the power machine 100 over a support surface. Tractive elements 140 are shown separate from the work element 130 because many power machines have additional work elements besides tractive elements, although that is not always the case. Power machines can have any number of tractive elements, some or all of which can receive power from the power source 120 to propel the power machine 100. Tractive elements can be, for example, track assemblies, wheels attached to an axle, and the like. Tractive elements can be mounted to the frame such that movement of the tractive element is limited to rotation about an axle (so that steering is accomplished by a skidding action) or, alternatively, pivotally mounted to the frame to accomplish steering by pivoting the tractive element with respect to the frame.

Power machine 100 includes an operator station 150 that includes an operating position from which an operator can control operation of the power machine. In some power machines, the operator station 150 is defined by an enclosed or partially enclosed cab. Some power machines on which the disclosed embodiments may be practiced may not have a cab or an operator compartment of the type described above. For example, a walk behind loader may not have a cab or an operator compartment, but rather an operating position that serves as an operator station from which the power machine is properly operated. More broadly, power machines other than work vehicles may have operator stations that are not necessarily similar to the operating positions and operator compartments referenced above. Further, some power machines such as power machine 100 and others, whether or not they have operator compartments or operator positions, may be capable of being operated remotely (i.e. from a remotely located operator station) instead of or in addition to an operator station adjacent or on the power machine. This can include applications where at least some of the operator controlled functions of the power machine can be operated from an operating position associated with an implement that is coupled to the power machine. Alternatively, with some power machines, a remote-control device can be provided (i.e. remote from both power machine and any implement to which is it coupled) that is capable of controlling at least some of the operator controlled functions on the power machine.

FIGS. 2-3 illustrate a loader 200, which is one particular example of a power machine of the type illustrated in FIG. 1 where the embodiments discussed below can be advantageously employed. Loader 200 is a skid-steer loader, which is a loader that has tractive elements (in this case, four wheels) that are mounted to the frame of the loader via rigid axles. Here the phrase "rigid axles" refers to the fact that the skid-steer loader 200 does not have any tractive elements that can be rotated or steered to help the loader accomplish a turn. Instead, a skid-steer loader has a drive system that independently powers one or more tractive elements on each side of the loader so that by providing differing tractive signals to each side, the machine will tend to skid over a support surface. These varying signals can even include powering tractive element(s) on one side of the loader to move the loader in a forward direction and powering tractive element(s) on another side of the loader to mode the loader in a reverse direction so that the loader will turn about a radius centered within the footprint of the loader itself. The term "skid-steer" has traditionally referred to loaders that have skid steering as described above with wheels as tractive elements. However, it should be noted that many track loaders also accomplish turns via skidding and are technically skid-steer loaders, even though they do not have wheels. For the purposes of this discussion, unless noted otherwise, the term skid-steer should not be seen as limiting the scope of the discussion to those loaders with wheels as tractive elements.

Loader 200 is one particular example of the power machine 100 illustrated broadly in FIG. 1 and discussed above. To that end, features of loader 200 described below include reference numbers that are generally similar to those used in FIG. 1. For example, loader 200 is described as having a frame 210, just as power machine 100 has a frame 110. Skid-steer loader 200 is described herein to provide a reference for understanding one environment on which the embodiments described below related to track assemblies and mounting elements for mounting the track assemblies to a power machine may be practiced. The loader 200 should not be considered limiting especially as to the description of features that loader 200 may have described herein that are not essential to the disclosed embodiments and thus may or may not be included in power machines other than loader 200 upon which the embodiments disclosed below may be advantageously practiced. Unless specifically noted otherwise, embodiments disclosed below can be practiced on a variety of power machines, with the loader 200 being only one of those power machines. For example, some or all of the concepts discussed below can be practiced on many other types of work vehicles such as various other loaders, excavators, trenchers, and dozers, to name but a few examples.

Loader 200 includes frame 210 that supports a power system 220, the power system being capable of generating or otherwise providing power for operating various functions on the power machine. Power system 220 is shown in block diagram form, but is located within the frame 210. Frame 210 also supports a work element in the form of a lift arm assembly 230 that is powered by the power system 220 and can perform various work tasks. As loader 200 is a work vehicle, frame 210 also supports a traction system 240, which is also powered by power system 220 and can propel the power machine over a support surface. The lift arm assembly 230 in turn supports an implement interface 270, which includes an implement carrier 272 that can receive and securing various implements to the loader 200 for performing various work tasks and power couplers 274, to which an implement can be coupled for selectively providing power to an implement that might be connected to the loader. Power couplers 274 can provide sources of hydraulic or electric power or both. The loader 200 includes a cab 250 that defines an operator station 255 from which an operator can manipulate various control devices 260 to cause the power machine to perform various work functions. Cab 250 can be pivoted back about an axis that extends through mounts 254 to provide access to power system components as needed for maintenance and repair.

The operator station 255 includes an operator seat 258 and a plurality of operation input devices, including control levers 260 that an operator can manipulate to control various machine functions. Operator input devices can include buttons, switches, levers, sliders, pedals and the like that can be stand-alone devices such as hand operated levers or foot pedals or incorporated into hand grips or display panels, including programmable input devices. Actuation of operator input devices can generate signals in the form of electrical signals, hydraulic signals, and/or mechanical signals. Signals generated in response to operator input devices are provided to various components on the power machine for controlling various functions on the power machine. Among the functions that are controlled via operator input devices on power machine 100 include control of the tractive elements 219, the lift arm assembly 230, the implement carrier 272, and providing signals to any implement that may be operably coupled to the implement.

Loaders can include human-machine interfaces including display devices that are provided in the cab 250 to give indications of information relatable to the operation of the power machines in a form that can be sensed by an operator, such as, for example audible and/or visual indications. Audible indications can be made in the form of buzzers, bells, and the like or via verbal communication. Visual indications can be made in the form of graphs, lights, icons, gauges, alphanumeric characters, and the like. Displays can be dedicated to provide dedicated indications, such as warning lights or gauges, or dynamic to provide programmable information, including programmable display devices such as monitors of various sizes and capabilities. Display devices can provide diagnostic information, troubleshooting information, instructional information, and various other types of information that assists an operator with operation of the power machine or an implement coupled to the power machine. Other information that may be useful for an operator can also be provided. Other power machines, such walk behind loaders may not have a cab nor an operator compartment, nor a seat. The operator position on such loaders is generally defined relative to a position where an operator is best suited to manipulate operator input devices.

Various power machines that are can include and/or interact with the embodiments discussed below can have various different frame components that support various work elements. The elements of frame 210 discussed herein are provided for illustrative purposes and frame 210 is not the only type of frame that a power machine on which the embodiments can be practiced can employ. Frame 210 of loader 200 includes an undercarriage or lower portion 211 of the frame and a mainframe or upper portion 212 of the frame that is supported by the undercarriage. The mainframe 212 of loader 200, in some embodiments is attached to the undercarriage 211 such as with fasteners or by welding the undercarriage to the mainframe. Alternatively, the mainframe and undercarriage can be integrally formed. Mainframe 212 includes a pair of upright portions 214A and 214B located on either side and toward the rear of the mainframe that support lift arm assembly 230 and to which the lift arm assembly 230 is pivotally attached. The lift arm assembly 230 is illustratively pinned to each of the upright portions 214A and 214B. The combination of mounting features on the upright portions 214A and 214B and the lift arm assembly 230 and mounting hardware (including pins used to pin the lift arm assembly to the mainframe 212) are collectively referred to as joints 216A and 216B (one is located on each of the upright portions 214) for the purposes of this discussion. Joints 216A and 216B are aligned along an axis 218 so that the lift arm assembly is capable of pivoting, as discussed below, with respect to the frame 210 about axis 218. Other power machines may not include upright portions on either side of the frame, or may not have a lift arm assembly that is mountable to upright portions on either side and toward the rear of the frame. For example, some power machines may have a single arm, mounted to a single side of the power machine or to a front or rear end of the power machine. Other machines can have a plurality of work elements, including a plurality of lift arms, each of which is mounted to the machine in its own configuration. Frame 210 also supports a pair of tractive elements in the form of wheels 219A-D on either side of the loader 200.

The lift arm assembly 230 shown in FIGS. 2-3 is one example of many different types of lift arm assemblies that can be attached to a power machine such as loader 200 or other power machines on which embodiments of the present discussion can be practiced. The lift arm assembly 230 is what is known as a vertical lift arm, meaning that the lift arm assembly 230 is moveable (i.e. the lift arm assembly can be raised and lowered) under control of the loader 200 with respect to the frame 210 along a lift path 237 that forms a generally vertical path. Other lift arm assemblies can have different geometries and can be coupled to the frame of a loader in various ways to provide lift paths that differ from the radial path of lift arm assembly 230. For example, some lift paths on other loaders provide a radial lift path. Other lift arm assemblies can have an extendable or telescoping portion. Other power machines can have a plurality of lift arm assemblies attached to their frames, with each lift arm assembly being independent of the other(s). Unless specifically stated otherwise, none of the inventive concepts set forth in this discussion are limited by the type or number of lift arm assemblies that are coupled to a particular power machine.

The lift arm assembly 230 has a pair of lift arms 234 that are disposed on opposing sides of the frame 210. A first end of each of the lift arms 234 is pivotally coupled to the power machine at joints 216 and a second end 232B of each of the lift arms is positioned forward of the frame 210 when in a lowered position as shown in FIG. 2. Joints 216 are located toward a rear of the loader 200 so that the lift arms extend along the sides of the frame 210. The lift path 237 is defined by the path of travel of the second end 232B of the lift arms 234 as the lift arm assembly 230 is moved between a minimum and maximum height.

Each of the lift arms 234 has a first portion 234A of each lift arm 234 is pivotally coupled to the frame 210 at one of the joints 216 and the second portion 234B extends from its connection to the first portion 234A to the second end 232B of the lift arm assembly 230. The lift arms 234 are each coupled to a cross member 236 that is attached to the first portions 234A. Cross member 236 provides increased structural stability to the lift arm assembly 230. A pair of actuators 238, which on loader 200 are hydraulic cylinders configured to receive pressurized fluid from power system 220, are pivotally coupled to both the frame 210 and the lift arms 234 at pivotable joints 238A and 238B, respectively, on either side of the loader 200. The actuators 238 are sometimes referred to individually and collectively as lift cylinders. Actuation (i.e., extension and retraction) of the actuators 238 cause the lift arm assembly 230 to pivot about joints 216 and thereby be raised and lowered along a fixed path illustrated by arrow 237. Each of a pair of control links 217 are pivotally mounted to the frame 210 and one of the lift arms 232 on either side of the frame 210. The control links 217 help to define the fixed lift path of the lift arm assembly 230.

Some lift arms, most notably lift arms on excavators but also possible on loaders, may have portions that are controllable to pivot with respect to another segment instead of moving in concert (i.e. along a pre-determined path) as is the case in the lift arm assembly 230 shown in FIG. 2. Some power machines have lift arm assemblies with a single lift arm, such as is known in excavators or even some loaders and other power machines. Other power machines can have a plurality of lift arm assemblies, each being independent of the other(s).

An implement interface 270 is provided proximal to a second end 232B of the lift arm assembly 234. The implement interface 270 includes an implement carrier 272 that is capable of accepting and securing a variety of different implements to the lift arm 230. Such implements have a complementary machine interface that is configured to be engaged with the implement carrier 272. The implement carrier 272 is pivotally mounted at the second end 232B of the arm 234. Implement carrier actuators 235 are operably coupled the lift arm assembly 230 and the implement carrier 272 and are operable to rotate the implement carrier with respect to the lift arm assembly. Implement carrier actuators 235 are illustratively hydraulic cylinders and often known as tilt cylinders.

By having an implement carrier capable of being attached to a plurality of different implements, changing from one implement to another can be accomplished with relative ease. For example, machines with implement carriers can provide an actuator between the implement carrier and the lift arm assembly, so that removing or attaching an implement does not involve removing or attaching an actuator from the implement or removing or attaching the implement from the lift arm assembly. The implement carrier 272 provides a mounting structure for easily attaching an implement to the lift arm (or other portion of a power machine) that a lift arm assembly without an implement carrier does not have.

Some power machines can have implements or implement like devices attached to it such as by being pinned to a lift arm with a tilt actuator also coupled directly to the implement or implement type structure. A common example of such an implement that is rotatably pinned to a lift arm is a bucket, with one or more tilt cylinders being attached to a bracket that is fixed directly onto the bucket such as by welding or with fasteners. Such a power machine does not have an implement carrier, but rather has a direct connection between a lift arm and an implement.

The implement interface 270 also includes an implement power source 274 that is available for connection to an implement on the lift arm assembly 230. The implement power source 274 includes pressurized hydraulic fluid port to which an implement can be removably coupled. The pressurized hydraulic fluid port selectively provides pressurized hydraulic fluid for powering one or more functions or actuators on an implement. The implement power source can also include an electrical power source for powering electrical actuators and/or an electronic controller on an implement. The implement power source 274 also exemplarily includes electrical conduits that are in communication with a data bus on the excavator 200 to allow communication between a controller on an implement and electronic devices on the loader 200.

Figure 4:
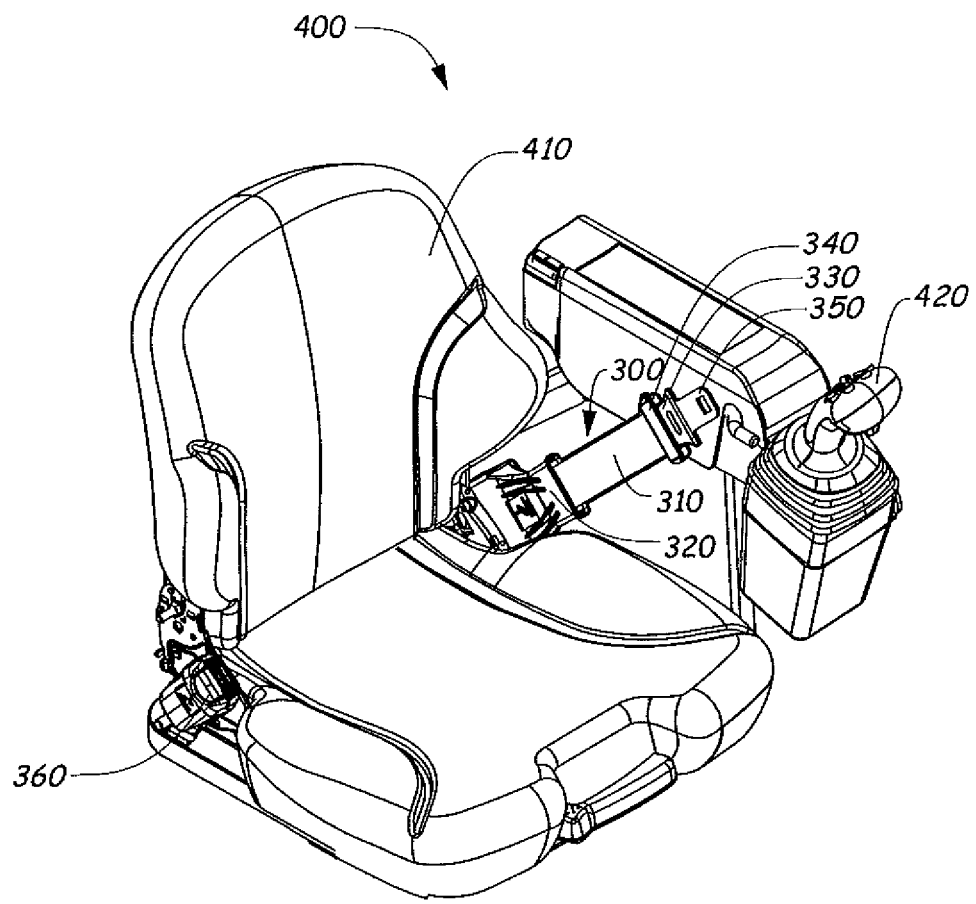
FIG. 4 is a diagrammatic illustration of portions of a seat belt assembly having a seat belt guide in accordance with an exemplary embodiment.

FIG. 4 illustrates one embodiment of a seat belt assembly 300 having a guide 310 with a guide attachment portion 320 that is mounted to an operator seat 410 within an operator compartment 400. Guide attachment portion 320 can be made from a material, such as plastic or metal, which can be stiffer, but need not be, than other portions of guide 310. A seat belt (not shown in FIG. 4, but coupled to a metal tab or tongue 350) is carried by guide 310. The seat belt includes a retractor (not shown), which includes a mechanism to retract the seat belt with is not coupled to a buckle 360.

Figure 9:
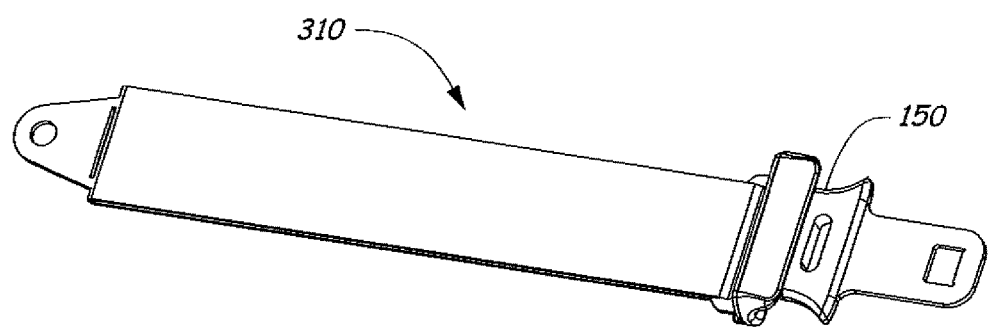
FIG. 9 illustrates a perspective view of the seat belt guide of FIG. 5 with a tongue in engagement with the tongue engagement member.

In exemplary embodiments including the one shown in FIG. 4, guide 310 is designed to be stiff enough to hold the metal tab or tongue 350 of the seat belt, (as shown in FIG. 9) when not engaged with the buckle 360 in a position that doesn't interfere with ingress and egress from the cab. Advantageously, the guide 310 holds the tongue 350 in a position that interferes with the operator's ability to manipulate a joystick or control lever or at least in a position that is convenient to access, so that the operator will be inclined to fasten the seat belt. When the seat belt is buckled, the guide will be drawn away from the joystick or control lever.

Guide 310 positions the seat belt such that the tongue 350 is positioned forward, above and to the side of seat 410, allowing ingress and egress from the cab or operator compartment by an operator without hitting the seat belt assembly. Guide 310 also positions the tongue 350 proximal to a joystick controller 420 such that the guide and seat belt can, in some embodiments, interfere with the operator's ability to manipulate joystick 420. Shown in FIG. 4 is an electronic joystick, but in other embodiments mechanical control levers can be employed. This positioning acts as a reminder to the operator to buckle the seat belt. In other embodiments, guide 310 can position the tongue 350 such that it does not interfere with operation of joystick controller 420, but such that the tongue 350 is in a raised position to remind the operator to buckle the seat belt.

As discussed, guide 310 is configured to be stiff enough to hold tongue 350, when not engaged with the buckle 360, in a position that doesn't interfere with ingress and egress from the cab, and preferably in a position that interferes with the operator's ability to manipulate a joystick 420 so that the operator will be inclined to fasten the seat belt. Fastening the seat belt draws the guide away from the joystick. Thus, guide 310 is preferably made from material(s) to provide flexibility in one direction to allow the guide to bend across the seat (or the lap of the user), but which is stiff in another direction to maintain the tongue at a raised position near joystick 420. In an example embodiment, guide 310 includes a plastic strip, or a strip made from other material, which is thin enough to allow bending with applied force from an operator along its longitudinal direction, but is wide enough to resist bending in directions orthogonal to the longitudinal direction.

Also, in exemplary embodiments, guide 310 is configured to allow the seat belt to easily retract. In other words, the guide 310 is configured to not restrict movement of the seat belt relative to the guide. In addition, in exemplary embodiments, the guide is configured to support the weight of the belt enough to prevent the weight of the belt from overwhelming the retractor mechanisms. This is particularly an issue at higher speeds (i.e. when the retractor is attempting to retract the belt quickly in response to a quick release of tension on the belt.

Figure 5:
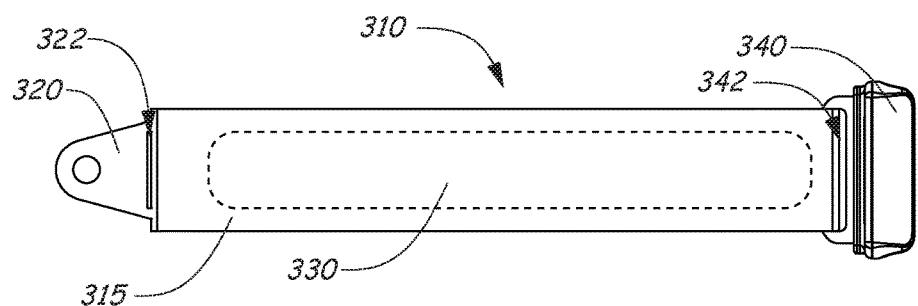
FIG. 5 is a top view of a seat belt guide shown in FIG. 4.
Figure 6:
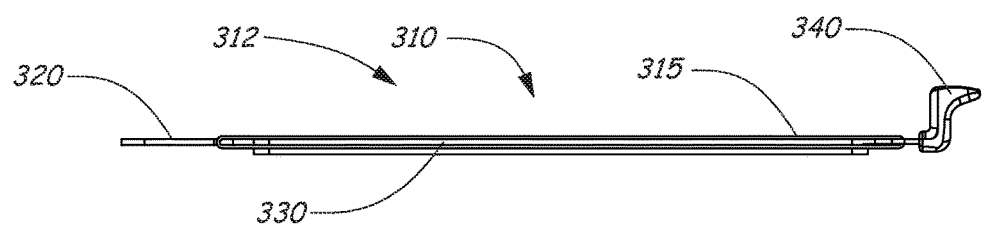
FIG. 6 is a side view of the seat belt guide shown in FIG. 4.

FIGS. 5-6 illustrate guide 310 for a seat belt assembly in more detail. Guide 310 includes a stiffener 312 with an attachment portion 320 attached to one end of the stiffener and a tongue engagement member 340 on another end thereof. The stiffener, in the embodiment shown, includes seat belt webbing material 315 that is connected to the attachment portion 320 and the tongue engagement member 340. A stiffening element 330, shown in phantom lines in FIG. 5, is fit within a pair of layers of webbing material 315. The stiffening element is, in some embodiments, spring steel. In other embodiments, the stiffening element 330 can be other materials, such as plastics or other metals, which are sufficiently flexible. The webbing material 315 in this embodiment is looped through apertures 322 and 342 in the attachment portion 320 and tongue engagement member 340, respectively. The stiffening element 330 and the tongue engagement member 340 are connected such that they are encouraged to maintain an attitude such the tongue engagement member 340 extends forward straight as shown in FIG. 7.

Figure 7:
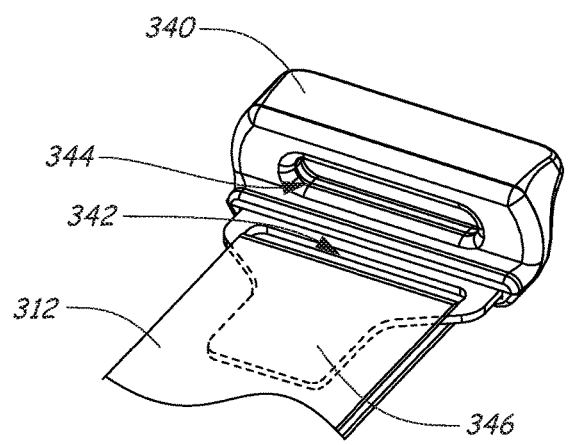
FIGS. 7-8 are diagrammatic illustrations of a portion of the seat belt guide showing perspective views of a tongue engagement member according to an exemplary embodiment.
Figure 8:
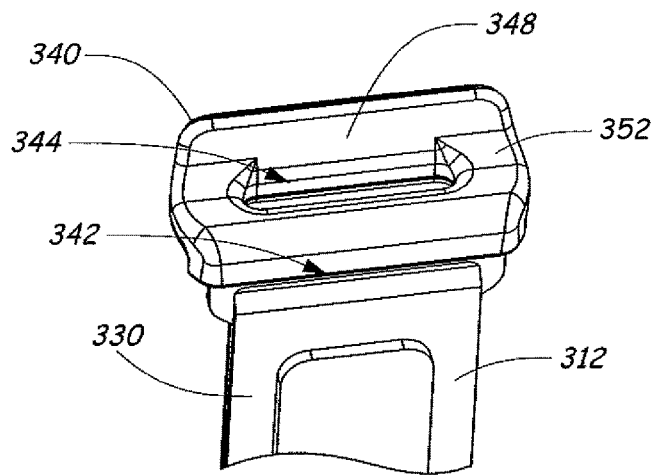

FIGS. 7-8 illustrate the tongue engagement member 340 in more detail. The tongue engagement member 340 in FIGS. 7-8 is attached to stiffener 312. The tongue engagement member 340 includes the aperture 342 through when the webbing material 315 is looped. The tongue engagement member 340 also includes an aperture 344 through which the seat belt can extend. The tongue engagement member 340 also includes a tab 348 that extends forward of an end surface 352 of the tongue engagement member 340. The tab 348 provides a support for the tongue 350 of the seat belt to hold the tongue in a generally inline position with respect to the guide when the retractor has drawn the seat belt in. This advantageously promotes the positioning of the tongue so that the tongue does not move around, making it easier to grab the tongue when the operator wants to fasten the seat belt or to allow an operator to enter/exit the operator seat.

The embodiments discussed above provide important advantages. For example, the seat belt guide advantageously positions the seat belt, when unbuckled, in a position where an operator will be able to easily access it, while at the same time positioning the belt so that the operator does not hit it while entering or exiting the operator compartment. In addition, the tongue engagement member positions the metal tongue relative to the stiffener in a convenient attitude when the seat belt is retracted to allow an operator to easily grab it when attempting to fasten the seat belt.

Although the present disclosure has been described by referring to preferred embodiments, workers skilled in the art will recognize that changes may be made in form and detail without departing from the spirit and scope of the disclosure.

What is claimed is:

1. A seat belt guide for a seat belt, having a retractor, on a power machine having one of a joystick and a control lever manipulable by an operator, the seat belt guide comprising:
   a stiffener;
   an attachment portion connected to a first end of the stiffener and configured to be attached to the retractor so that the stiffener extends from the retractor and an operator seat;
   a tongue engagement member connected to a second end of the stiffener and configured to support a tongue of a seat belt when the seat belt is retracted by the retractor, wherein the retractor applies a force against the tongue to hold the tongue against the tongue engagement member; and
   wherein the stiffener and tongue engagement member are configured and arranged to hold the tongue in a generally inline position with respect to a longitudinal direction of the stiffener and at a raised position relative to the operator seat when the tongue is not engaged with a corresponding seat belt buckle such that the tongue interferes with operation of the joystick or control lever.

2. The seat belt guide of claim 1, wherein the stiffening element is configured to allow bending in the longitudinal direction, but resist bending in directions orthogonal to the longitudinal direction.

3. The seat belt guide of claim 1, wherein the tongue engagement member includes a tab configured to support the tongue in the generally inline position with respect to a longitudinal direction of the stiffener.

4. The seat belt guide of claim 3, wherein the tab of the tongue engagement member extends in the longitudinal direction from an end surface of the tongue engagement member.

5. The seat belt guide of claim 1, wherein the tongue engagement member and the attachment portion each include apertures, and wherein the seat belt guide further comprises a material on each of two sides of the stiffening element, the material extending through the apertures of the tongue engagement member and the attachment portion.

6. The seat belt guide of claim 2, wherein the stiffening element comprises spring steel.

7. The seat belt guide of claim 2, wherein the stiffening element comprises a plastic or metal.

8. An operator compartment of a power machine, the operator compartment comprising:
an operator seat;
an operator input device positioned proximal to the operator seat;
a seat belt including a first portion having a tongue and a second portion having a buckle configured to engage with the tongue; and
a seat belt guide configured to position the seat belt tongue at a position raised from the operator seat and adjacent to the operator input device so as to allow ingress into the operator compartment to access the operator seat without interference from the first portion of the seat belt when the tongue is not engaged with the buckle so as to interfere with operation of the operator input device.

9. The operator compartment of claim 8, wherein the operator input device is a joystick controller positioned in front of the operator seat.

10. The operator compartment of claim 8, wherein the seat belt guide further comprises a stiffener configured to allow bending in a longitudinal direction of the seat belt guide, but resist bending in directions orthogonal to the longitudinal direction.

11. The operator compartment of claim 10, wherein the seat belt guide further comprises a tongue engagement member connected to the stiffener and configured to support the tongue at the position raised from the operator seat.

12. The operator compartment of claim 11, wherein the tongue engagement member includes a tab configured to support the tongue in a generally inline position with respect to the longitudinal direction of the seat belt guide.

13. The operator compartment of claim 12, wherein the tab of the tongue engagement member extends in the longitudinal direction from an end surface of the tongue engagement member.

14. The operator compartment of claim 11, wherein the seat belt guide further comprises an attachment portion connected to the stiffener and attached to a portion of the operator compartment.

15. The seat belt guide of claim 14, wherein the tongue engagement member and the attachment portion each include apertures, and wherein the seat belt guide further comprises a material on each of two sides of a stiffening element of the stiffener, the material extending through the apertures of the tongue engagement member and the attachment portion.

16. The operator compartment of claim 10, wherein the stiffener includes a stiffening element configured to allow bending in the longitudinal direction, but resist bending in directions orthogonal to the longitudinal direction.

17. The operator compartment of claim 15, wherein the stiffening element comprises at least one of spring steel, metal, and plastic.

* * * * *